(12) United States Patent
Strait et al.

(10) Patent No.: US 10,137,675 B1
(45) Date of Patent: Nov. 27, 2018

(54) APPLICATION OF POLYMER THERMOFOIL TO METAL SUBSTRATE

(71) Applicant: Midmark Corporation, Versailles, OH (US)

(72) Inventors: Scott Strait, Greenville, OH (US); Alan Heitkamp, Maria Stein, OH (US); Duane Rieman, Versailles, OH (US); Linda Steinbrunner, Fort Recovery, OH (US)

(73) Assignee: Midmark Corporation, Versailles, OH (US)

( * ) Notice: Subject to any disclaimer, the term of this patent is extended or adjusted under 35 U.S.C. 154(b) by 157 days.

(21) Appl. No.: 14/985,962

(22) Filed: Dec. 31, 2015

Related U.S. Application Data

(60) Provisional application No. 62/099,163, filed on Jan. 1, 2015.

(51) Int. Cl.
*B32B 37/10* (2006.01)
*B32B 37/12* (2006.01)
*B29C 65/00* (2006.01)
*B29C 51/08* (2006.01)

(52) U.S. Cl.
CPC ........ *B32B 37/1207* (2013.01); *B29C 51/082* (2013.01); *B29C 66/742* (2013.01); *B32B 37/10* (2013.01); *B32B 2327/06* (2013.01)

(58) Field of Classification Search
None
See application file for complete search history.

(56) References Cited

U.S. PATENT DOCUMENTS

| | | | | |
|---|---|---|---|---|
| 2,877,151 A | * | 3/1959 | Doherty | B32B 15/08 101/32 |
| 3,523,513 A | * | 8/1970 | Maier | B23K 1/16 413/69 |
| 4,511,404 A | * | 4/1985 | Drake | C08K 3/32 106/14.12 |
| 2010/0031490 A1 | * | 2/2010 | Webb | B32B 3/28 29/469.5 |
| 2015/0361304 A1 | * | 12/2015 | Gruhn | B32B 5/26 428/414 |

* cited by examiner

*Primary Examiner* — Barbara J Musser
(74) *Attorney, Agent, or Firm* — Frost Brown Todd LLC

(57) ABSTRACT

The present invention is directed to a novel method for application of polymer thermofoil to a metal substrate. The method involves first coating a metal substrate with an oxidation-preventing or oxidation-limiting coating, then adhering a polymer thermofoil to the metal substrate. After application of the thermofoil, the metal substrate can be formed to the final shape. The method is advantageous in that it allows one to efficiently manufacture metal objects in a variety of aesthetically pleasing surface finishes.

15 Claims, 2 Drawing Sheets

APPLICATION OF POLYMER THERMOFOIL TO METAL SUBSTRATE

CLAIM OF PRIORITY

This application claims priority to U.S. 62/099,163.

BACKGROUND AND BRIEF SUMMARY OF THE INVENTION

The present invention is directed to a novel method for making metal cabinetry and other metal objects more aesthetically pleasing to the end user. More particularly, the present invention involves the application of thermofoil surface finish to metal substrate as will be described in greater detail below.

Thermofoil surface finish is well known in the cabinetry industry, so will not be discussed in detail herein. However, briefly stated, thermofoil is a thin polymeric material (commonly a plasticized polyvinyl chloride) that is thermoformed, under vacuum pressure to a substrate, thus giving the substrate a durable top coat or surface finish. Thermofoil comes in a number of finishes, including high and low sheen, metallic-like finishes and faux wood grain finishes. The process of applying thermofoil generally involves the steps of (1) preparing the substrate, (2) applying adhesive to the substrate and/or thermofoil, (3) placing the thermofoil layer over the substrate, and (4) heating the thermofoil while under vacuum to cause the thermofoil to stretch and form to the underlying substrate (normally accomplished using a vacuum membrane press). Up to this point, thermofoil has generally been applied to various wood-based surfaces since wood is easily contoured and shaped. However, the present invention discloses a novel method that allows the application of thermofoil to an unformed metal substrate that can then be subsequently formed to a final product, thus resulting in a more aesthetically pleasing outcome.

As just mentioned, thermofoil is most commonly applied to a wood or fiberboard substrate. More particularly, it is frequently applied to medium density fiberboard (MDF). Fiberboard lends itself well to such applications because it can be easily milled to different profiles over which the thermofoil can be applied. Thus, when used in cabinetry applications, a faux wood grain thermofoil can be used to give the appearance of milled solid wood cabinetry at significantly reduced cost. The same is likewise true if a solid colored thermofoil is used—it gives the appearance of painted solid wood, but provides a much more durable finish than a painted surface, and can generally be done at a lower cost.

In contrast to wood-based substrates, working with thermofoil on metal substrates can be difficult for a number of reasons. Often, pre-formed or pre-machined metal substrates are shaped in such a way that it is impossible to apply thermofoil to the part, or even if thermofoil can be applied to the part, it is simply not practical to place these parts in the vacuum membrane press during the thermofoil application process. In addition, because these parts are metal, they often have sharp edges that can easily damage the vacuum membrane press during thermofoil application. Because of these and other issues, thermofoil has historically not been used in applications in which it is applied to a metal substrate. Rather, paints, powder coatings, and the like have become the standard coating or covering used in finishing metal surfaces.

In certain heavy-use applications, it is often beneficial to construct cabinetry out of metal. One preferred metal for use in manufacturing metal cabinetry is steel, although aluminum or other metals or alloys could be used in other embodiments of the present invention. Steel provides superb durability as well as excellent strength when compared to its weight. However, in certain applications the aesthetic appeal of steel cabinets finished in a single color paint or powder coat finish is not ideal. To address this, manufacturers have previously offered cabinetry comprising a steel cabinet body with cabinet doors made of MDF finished with a faux wood grain thermofoil. The thermofoil cabinet doors in combination with an appropriate countertop allows the cabinet to be much more aesthetically appealing, yet still sufficiently durable for heavy-use applications. While such an arrangement offers clear advantages, it does not fully eliminate aesthetic concerns, as the metal body of the cabinet is still unable to be offered in more aesthetically pleasing finishes such as faux wood grain or other finish selected to match accompanying cabinet doors.

The present invention addresses this need by providing a method of applying thermofoil to a metal substrate to produce an aesthetically pleasing result while also remaining relatively easy to apply and process.

DETAILED DESCRIPTION OF THE INVENTION

The present invention is directed to a novel process for applying thermofoil to a metal substrate. More specifically, the present invention is directed to application of thermofoil to a painted, or coated, metal substrate.

While the present invention is primarily focused on the use of thermofoil-coated metal substrates in cabinetry, it will be understood that the methods described herein can also be used in non-cabinetry applications, such as in automotive accessories, other household accessories, or other instances in which a thermofoil-coated metal substrate would beneficially provide both aesthetics and durability.

Figure 1:
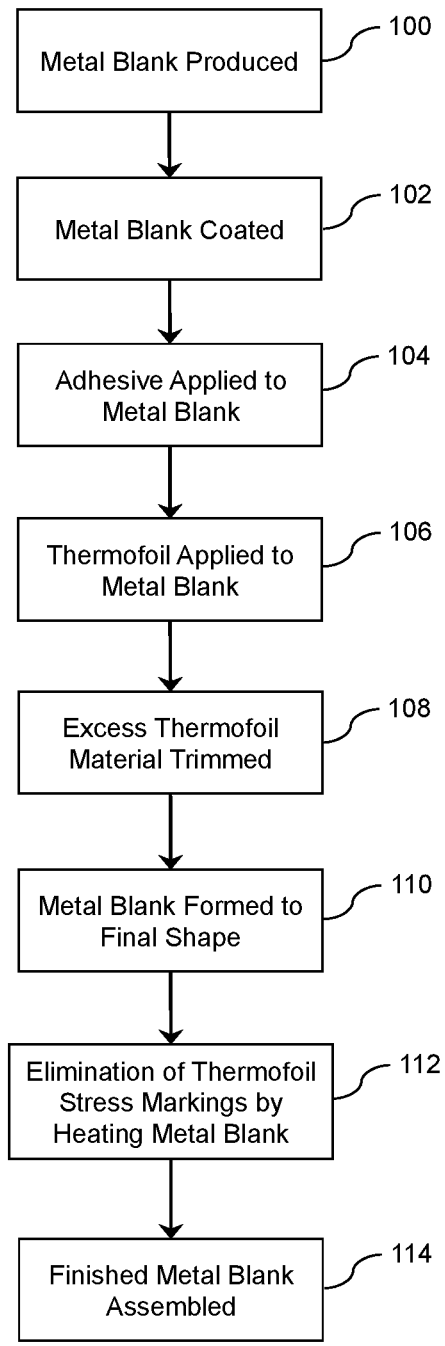
FIG. 1 Flowchart depicting the steps involved in one preferred embodiment of the present invention.

Turning now to a description of FIG. 1, there is shown a flow chart depicting one preferred method of performing the process of the present invention. Each of the steps involved in the flow chart will be described in greater detail below, including variations of these steps that also fall within the scope of the present invention.

In box 100, an initial metal blank is produced. By producing a metal blank it is meant that stock metal material (e.g., steel sheets or other similar starting material) is cut into the desired initial shape. In the case of using metal sheets as the starting material, a blank can be cut from the sheets, with the blank including holes and other cutouts required for the part to have the correct shape and features once it reaches its final form. For example, holes may be cut in the flat sheet for later use in mounting hinges or other cabinetry hardware, mounting a shelf, or interlocking with other cabinet pieces. Alternatively, a metal blank can comprise a single flat sheet that is cut to final shape after the application of a polymer thermofoil to the flat sheet. However, it will be understood that at this step the metal blank remains flat and is not formed other than being cut. The cutting of the metal blank can be accomplished using any methods commonly known in the art (e.g., plasma, press cutting or stamping, etc.).

Once the initial metal blank is produced it is then coated 102. By coated it is meant that the metal blank is covered on at least one surface with some form of oxidation-preventing or oxidation-limiting coating. Such coatings are well known in the art and include solvent-based coatings, such as paints and epoxies, and dry coatings such as powder-based coatings that are heated after application to form a uniform surface covering. In one preferred embodiment, the metal blank is fully covered with a powder coating during this step. The advantages of powder coating are many and are well known in the art, so will not be discussed in detail herein. However, it will be noted that in undergoing the coating process, the coating used will preferably have an elastic modulus of low enough value to allow the metal blank to later undergo bending without the coating developing cracks or other imperfections. Likewise, the adhesive properties between the coating and the metal will also preferably be of sufficient strength to allow the metal blank to be bent and formed after coating without causing detachment of the coating.

It will be understood that the process of coating the metal blank also provides aesthetic benefit. Specifically, while the outer surface of the metal blank will eventually be covered with thermofoil, fully coating the metal blank prevents any unfinished edges, inner surfaces, or other bare metal surfaces from showing in the final product and also prevents oxidation of the underlying metal substrate, thus providing a more aesthetically pleasing final product.

Once the metal blank is coated, a layer of adhesive is applied to at least one surface of the metal blank 104. Specifically, the adhesive is preferably applied to the surface to which the thermofoil will be affixed. The adhesive can be a hot melt adhesive, solvent based adhesive, or other standard adhesive known in the art. One common adhesive used in such applications is a polyurethane-based moisture reactive curing hot melt adhesive. In one preferred embodiment of the present invention a pressure-sensitive hot melt adhesive is used. Application of the adhesive can be performed using techniques known in the art such as direct application using a brush or other applicator or by use of a sprayer to apply an even coat of adhesive through aerosolization and subsequent deposition on the desired surface. However, as with the step of coating the metal substrate, the adhesive preferably has elastic properties that allow it to undergo bending and forming without losing adhesion or failing in some other manner.

After application of the adhesive, a sheet of thermofoil covering is applied to the surface of the metal blank 106 on which the adhesive was applied in the prior step. The thermofoil is then adhered to the surface of the metal blank. As noted above, in one preferred embodiment of the present invention, a pressure sensitive hot melt adhesive is used to bond the thermofoil to the metal blank. In this case the metal blank is heated and pressure is applied in order to attach the thermofoil to the metal blank. Because the metal blank is still flat during this step, a vacuum membrane press is unnecessary since there are no surface contours on the metal blank to which the thermofoil needs to conform. Rather, a roller, a press, or other similar apparatus can be used to apply pressure to the thermofoil to ensure that proper adhesion occurs. This also provides efficiency in manufacturing since such an approach eliminates the need for a manufacturer to invest in a vacuum membrane press. It will be understood, however, that in certain embodiments of the present invention the metal blank may have certain surface contours formed in the metal through the use of presses, dies, etc., and in these instances a vacuum membrane press could be required to ensure that the thermofoil becomes properly attached to the underlying metal blank.

As with the above-noted coating, the thermofoil preferably exhibits mechanical properties that allow it to undergo bending and forming without cracking or otherwise detaching from the underlying metal blank. Specifically, the thermofoil preferably has an elastic modulus of low enough value to allow it to later undergo bending to angles greater than 90 degrees without the thermofoil developing cracks, but high enough that the thermofoil does not easily take on permanent impressions or other surface imperfections from the forces involved in being in contact with the forming equipment used to shape the metal blank into its final form.

Once the thermofoil has been adhered to the surface of the metal blank, the excess thermofoil must be trimmed 108 from the edges as well as any needed openings included in the metal blank (e.g., a slot or hole used for supporting a shelf after assembly). The trimming process can be done manually or with the use of automated equipment set to properly index and trim each metal blank. Methods for trimming excess thermofoil are well known in the art and will thus not be addressed in further detail herein. Alternatively, if the metal blank from step 100 is simply a flat sheet that has been fully coated with thermofoil, the trimming process of step 108 can comprise the cutting of both the thermofoil and metal blank to the final dimensions prior to forming.

Up to this point in the process, it will be noted that the metal blank, or metal substrate, comprises a flat, or 2-dimensional, object. However, after the trimming step 108, the forming process is begun 110. Through use of press brakes and other metal forming tools and equipment known in the art, the metal blank is formed into its final 3-dimensional shape, with care being taken not to damage the softer thermofoil covering during the forming process. Final shape can vary widely depending on the final structure needed and the mechanical strength needed when the metal blank is assembled as part of the final product. Critically, however, it has been observed that during the forming process the thermofoil will develop stress markings indicated by a whitening of the thermofoil covering near, or over, the point(s) where the metal blank is bent or otherwise formed. This whitening is the result of the applied stress causing shifting of the molecular bonds of the thermofoil. This phenomenon is often referred to as crazing. This whitening is not desirable from an aesthetic standpoint as it causes inconsistencies in the finish of the final product. To address this whitening, the method of the present invention includes the step of heating the metal blank after forming 112. This heating allows the local stress causing the whitening of the thermofoil to be relieved and thus eliminates the stress whitening, returning the thermofoil to its original finish. Heating is preferably done to a point below the melting point of the thermofoil and to a temperature relatively near to, or higher than the glass transition temperature of the thermofoil. In an alternative embodiment of the present invention, the thermofoil-covered metal blank may be heated during the forming process as a way of eliminating or reducing the occurrence of stress whitening during the forming process. In still another alternative embodiment, the color of the thermofoil can be such that the stress whitening does not aesthetically affect the final product, or the thermofoil can be formulated to withstand bending with minimal or no stress whitening—in either case, it will be understood that heating of the thermofoil blank would be unnecessary under these circumstances and that such a step could then be omitted from the method.

Once the stress whitening has been eliminated (if present), the metal blank is considered finished 114. If the metal blank is a smaller part of a larger final product, it can then be assembled as part of the final product.

Figure 2:
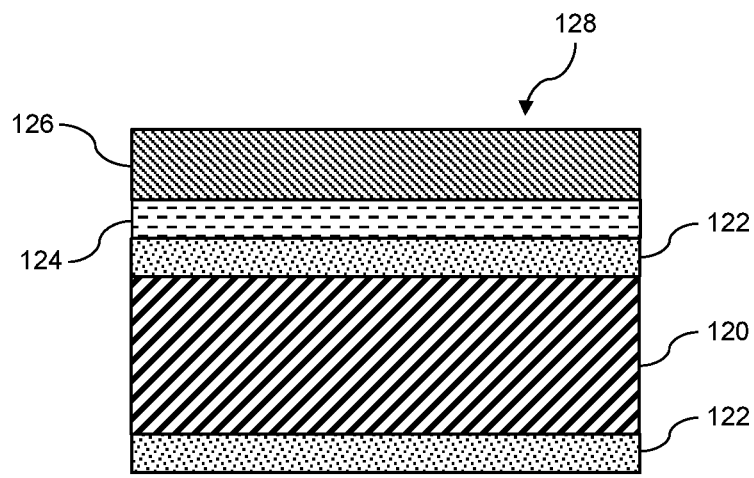
FIG. 2 A cross-section of the finished product of one preferred embodiment of the present invention.

Turning now to FIG. 2, there is shown a cross section of a completed metal blank 128. It will be noted that FIG. 2 is not drawn to scale. As illustrated in FIG. 2, a metal substrate 120 is coated with an oxidation-preventing or oxidation-limiting coating 122. As mentioned above, such coatings are well known in the art and include solvent-based coatings, such as paints and epoxies, and dry coatings such as powder-based coatings that are heated after application to form a uniform surface coating. An adhesive layer 124 is also shown, bonding the thermofoil 126 to the coated metal substrate 120, 122.

While the above description has focused primarily on application of polymer thermofoil to a precut metal blank, it will also be understood that in other embodiments of the present invention entire sheets of stock material could be covered with thermofoil using the above process and then subsequently cut into appropriate blanks for later forming into finished parts as already mentioned above.

It will be apparent to those skilled in the art that various modifications and variations can be made to the present invention without departing from the spirit and scope of the invention as set forth in the above description. Thus, it is intended that the present invention cover the modifications and variations of this invention provided they come within the scope of the invention and its equivalents.

What is claimed is:

1. A method comprising:
   (a) coating at least one surface of a metal substrate while in a first shape with an oxidation-preventing or oxidation-limiting coating;
   (b) applying adhesive to at least one surface of the coated metal substrate;
   (c) applying a thermofoil sheet having an original finish to the adhesive, thus causing the thermofoil sheet to adhere to the metal substrate;
   (d) forming the metal substrate into a second shape;
   (e) in response to forming the metal substrate into the second shape, transforming the original finish into a crazed finish;
   (f) heating the metal substrate while in the second shape; and
   (g) in response to heating the metal substrate, transforming the crazed finish into the original finish.

2. The method of claim 1 wherein the adhesive applied to the at least one surface of the coated metal substrate comprises a hot melt adhesive.

3. The method of claim 1 wherein the oxidation-preventing coating comprises a powder-based coating.

4. The method of claim 1 wherein the thermofoil sheet comprises polyvinyl chloride.

5. The method of claim 1 wherein the step of forming the metal substrate into the second shape is accomplished using a press brake.

6. A method comprising:
   (a) coating at least one surface of a metal blank with an oxidation-preventing or oxidation-limiting coating;
   (b) applying adhesive to at least one surface of the coated metal blank;
   (c) thermoforming a thermofoil sheet having an original finish to the adhesive, thus causing the thermofoil sheet to adhere to the metal blank;
   (d) forming the metal blank into a final shape;
   (e) in response to forming the metal blank into the final shape, creating a stress marking in the thermofoil sheet;
   (f) heating the metal blank after forming the metal blank into the final shape; and
   (g) in response to heating the metal blank, transforming the stress marking into the original finish of the thermofoil sheet.

7. The method of claim 6 wherein the adhesive applied to the at least one surface of the coated metal substrate comprises a hot melt adhesive.

8. The method of claim 6 wherein the oxidation-preventing coating comprises a powder-based coating.

9. The method of claim 6 wherein the thermofoil sheet comprises polyvinyl chloride.

10. The method of claim 6 wherein the step of forming the metal blank into the final shape is accomplished using a press brake.

11. A method comprising:
    (a) coating at least one surface of a metal sheet with an oxidation-preventing or oxidation-limiting coating;
    (b) applying adhesive to the oxidation-preventing or oxidation-limiting coating;
    (c) applying a thermofoil sheet having an original finish to the adhesive, thus causing the thermofoil sheet to adhere to the metal sheet;
    (d) cutting the thermofoil-covered metal sheet to a shape conducive to forming the metal sheet to a final shape;
    (e) forming the cut metal sheet into the final shape;
    (f) in response to forming the cut metal sheet into the final shape, transforming the original finish into a crazed finish of the thermofoil sheet;
    (g) heating the metal sheet; and
    (h) in response to heating the metal sheet, transforming the crazed finish into the original finish of the thermofoil sheet.

12. The method of claim 11 wherein the adhesive applied to the oxidation-preventing or oxidation-limiting coating comprises a hot melt adhesive.

13. The method of claim 11 wherein the oxidation-preventing coating comprises a powder-based coating.

14. The method of claim 11 wherein the thermofoil sheet comprises polyvinyl chloride.

15. The method of claim 11 wherein the step of forming the metal blank into the final shape is accomplished using a press brake.

* * * * *